May 25, 1965  H. P. TAYLOR ETAL  3,185,929
SUM AND DIFFERENCE FREQUENCY COMPUTERS FOR AMPLITUDE MODULATORS
Filed March 28, 1963  4 Sheets-Sheet 1

INVENTORS
HUGH P. TAYLOR
JAMES C. DAVIS, JR.
BY
ATTORNEY
AGENT

3,185,929
SUM AND DIFFERENCE FREQUENCY COMPUTERS FOR AMPLITUDE MODULATORS
Hugh P. Taylor, Wayland, and James C. Davis, Jr., Carlisle, Mass., assignors to the United States of America as represented by the Secretary of the Air Force
Filed Mar. 28, 1963, Ser. No. 268,839
5 Claims. (Cl. 328—133)

This invention relates to a device to provide a mathematical function of two frequencies, such as, sum or difference frequency information which may be used to amplitude modulate a carrier.

One object of the invention is to provide a device which will produce a voltage proportional to the sum of two frequencies which voltage may be used to amplitude modulate a carrier.

Another object of the invention is to provide a device which will produce a voltage proportional to the difference of two frequencies which voltage may be used to amplitude modulate a carrier.

These and other objects will be more fully understood from the following detailed description taken with the drawing wherein.

It is sometimes desirable to provide the mathematical functions of frequency, such as addition or subtraction, in terms of a voltage amplitude and to use this voltage to amplitude modulate an A.C. carrier. The circuit of FIG. 1 will provide such a voltage proportional to the difference of two frequencies.

Figure 1:
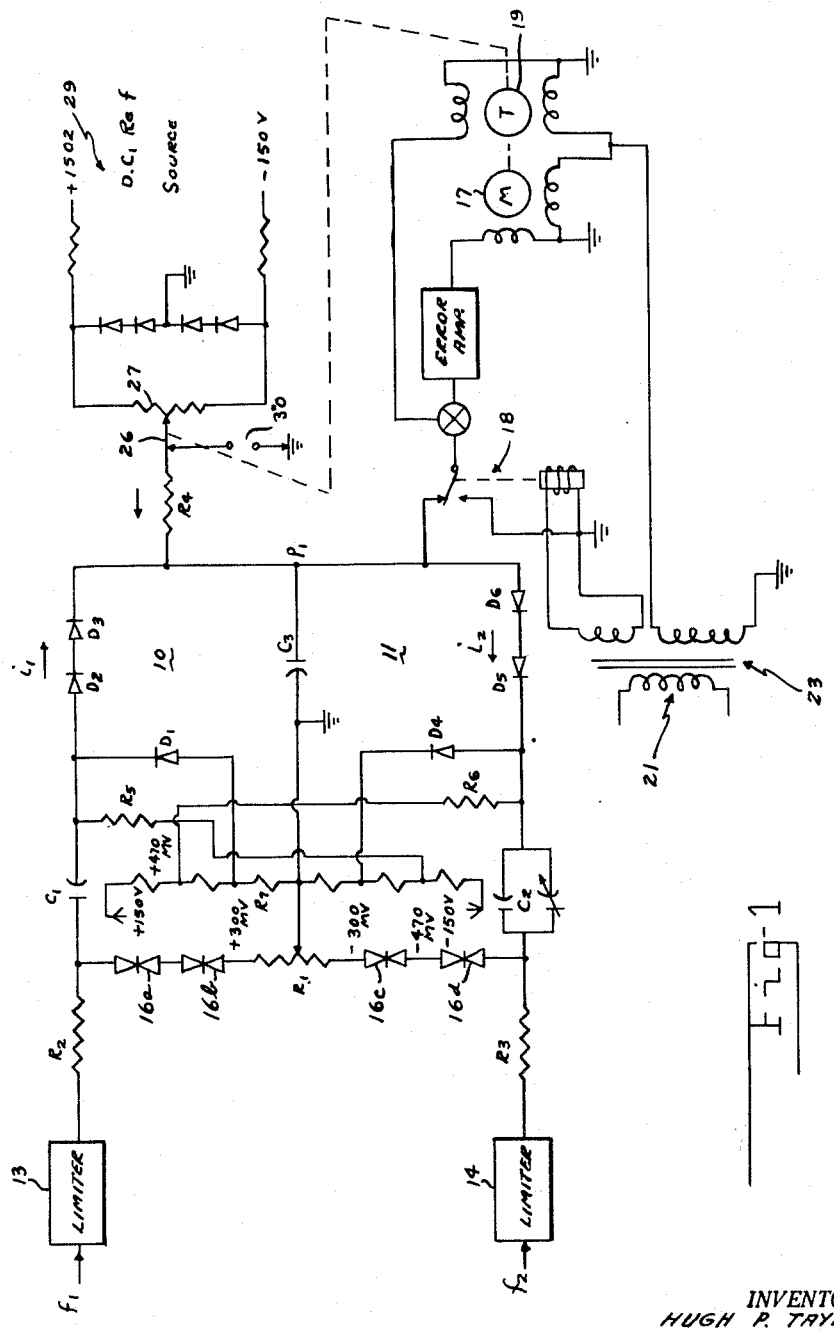
FIG. 1 is a circuit diagram of a computer for providing a voltage output proportional to the difference of the two frequencies.

The circuit of FIG. 1 has two rate counters 10 and 11 having condensers $C_1$ and $C_2$, respectively, and switching diodes $D_1$, $D_2$, $D_3$ and diodes $D_4$, $D_5$ and $D_6$, respectively. Diodes $D_1$ and $D_4$ are biased so that with zero signal input they will be operating slightly above the knee of their current-voltage characteristic, that is, they will be in low impedance state so that a low impedance condition will be maintained in the charge paths of condensers $C_1$ and $C_2$ even when the charge current approaches zero. This prevents the drop-off in the counter slope characteristic that would occur at high frequency inputs, because of an increasing charge time constant as the $C_1$ and $C_2$ as the charging currents approach zero, if the diodes were not biased in a low impedance state.

The diodes $D_2$, $D_3$, $D_4$ and $D_5$ in the charge transferral paths between storage condensers $C_1$ and $C_2$ and bucket condenser $C_3$ are biased below the knee of their voltage-current characteristic and thus maintained in a high impedance state for zero input. This bias is obtained by connecting two diodes in series in each path between the storage condensers $C_1$ and $C_2$ and the bucket condenser $C_3$. Thus with $D_1$ and $D_4$ biased slightly above the knee of their current-voltage characteristic, this will provide the maximum sensitivity condition for the rate counters.

Variations in the slopes of the individual diode rate counter output versus input characteristics must be compensated for to obtain a reasonable degree of accuracy. The slopes of the two counter characteristics are equalized by balancing the peak-to-peak input voltage waveforms by means of a variable resistor $R_1$ connected in the ground connections of bi-polar voltage limiter diodes $16a$, $16b$, $16c$ and $16d$ which may, for example, be symmetrical zener diodes.

Figure 4:
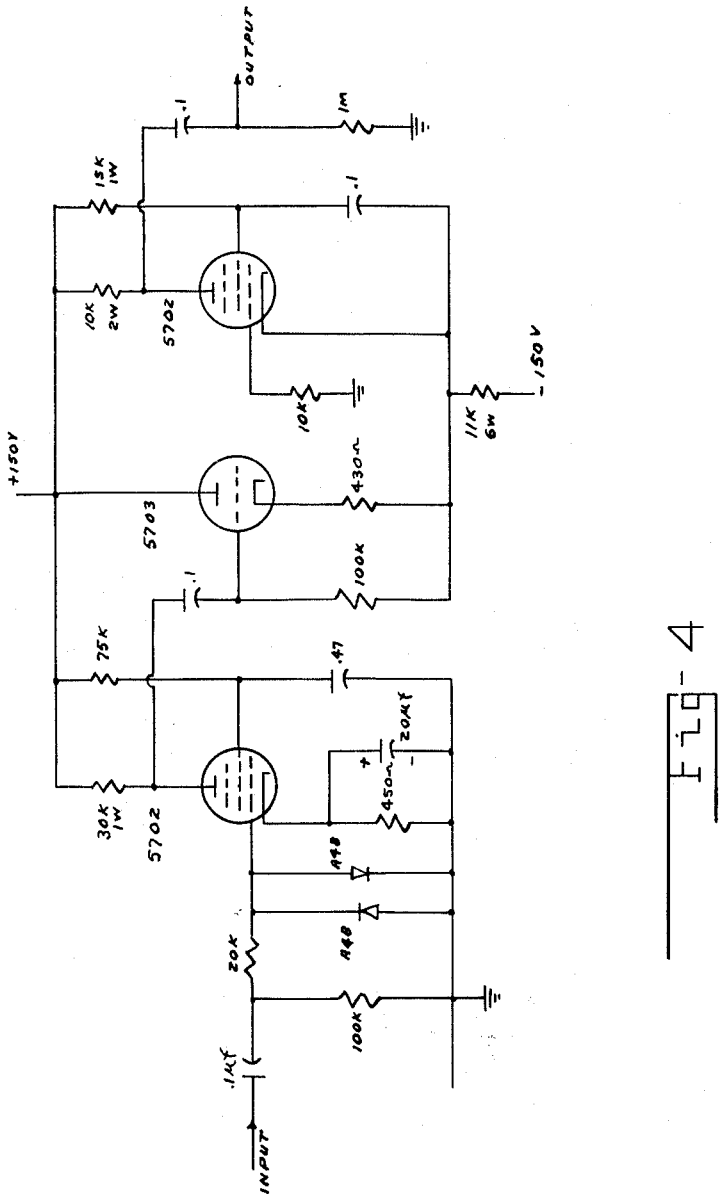
FIG. 4 is a circuit schematic of a limiter circuit which may be used with the devices of FIGS. 1–3.

Although the exact duty cycle of the input waveforms is not critical, it must remain the same for all expected input frequencies if best computation accuracy is to be obtained. Prelimiter circuits 13 and 14 may therefore be inserted in the input circuits of the counters to drive the counter with square waves of equal amplitude. The particular limiter used forms no part of this invention, however, the circuit for one limiter which may be used is shown in FIG. 4.

The output of rate counters 10 and 11 are combined in the bucket capacitor $C_3$. The voltage appearing at point $P_1$ is fed to a servomotor 17, through a chopper 18, to control a nulling system. Damping is provided by means of a damping element 19, such as, an electrical tachometer, which is mechanically coupled to motor 17 and which feeds back a damping signal to the input of the motor as shown. Control power for the chopper 18, motor 17 and tachometer 19 are provided from an A.C. source 21 through an isolation transformer 23. The center arm 26 of servopotentiometer 27, connected across a reference voltage source 29, is mechanically connected to motor 17 in the usual manner to provide a nulling current to the bucket capacitor $C_3$ for nulling out the current at point $P_1$. A voltage proportional to the difference of the two input frequencies may be taken off at 30.

In the operation of the device of FIG. 1 the currents $i_1$ and $i_2$ in rate counters 10 and 11 are proportional to the frequencies $f_1$ and $f_2$ respectively. By combining these currents in the bucket capacitor $C_3$ and simultaneously nulling out the resultant current at point $P_1$ by a feedback current supplied through resistor $R_4$ from the center arm of the servocontrolled potentiometer 27 a voltage is obtained at 30 which is proportional to $f_1-f_2$.

In the operation of the device of FIG. 1 the currents between the two input signals from occurring at the output when the input frequencies are within a few cycles of each other, the ratio of the charge condensers $C_1$ and $C_2$ to the bucket condenser $C_3$ must be kept very small, for example, $\frac{1}{10,000}$.

Figure 2:
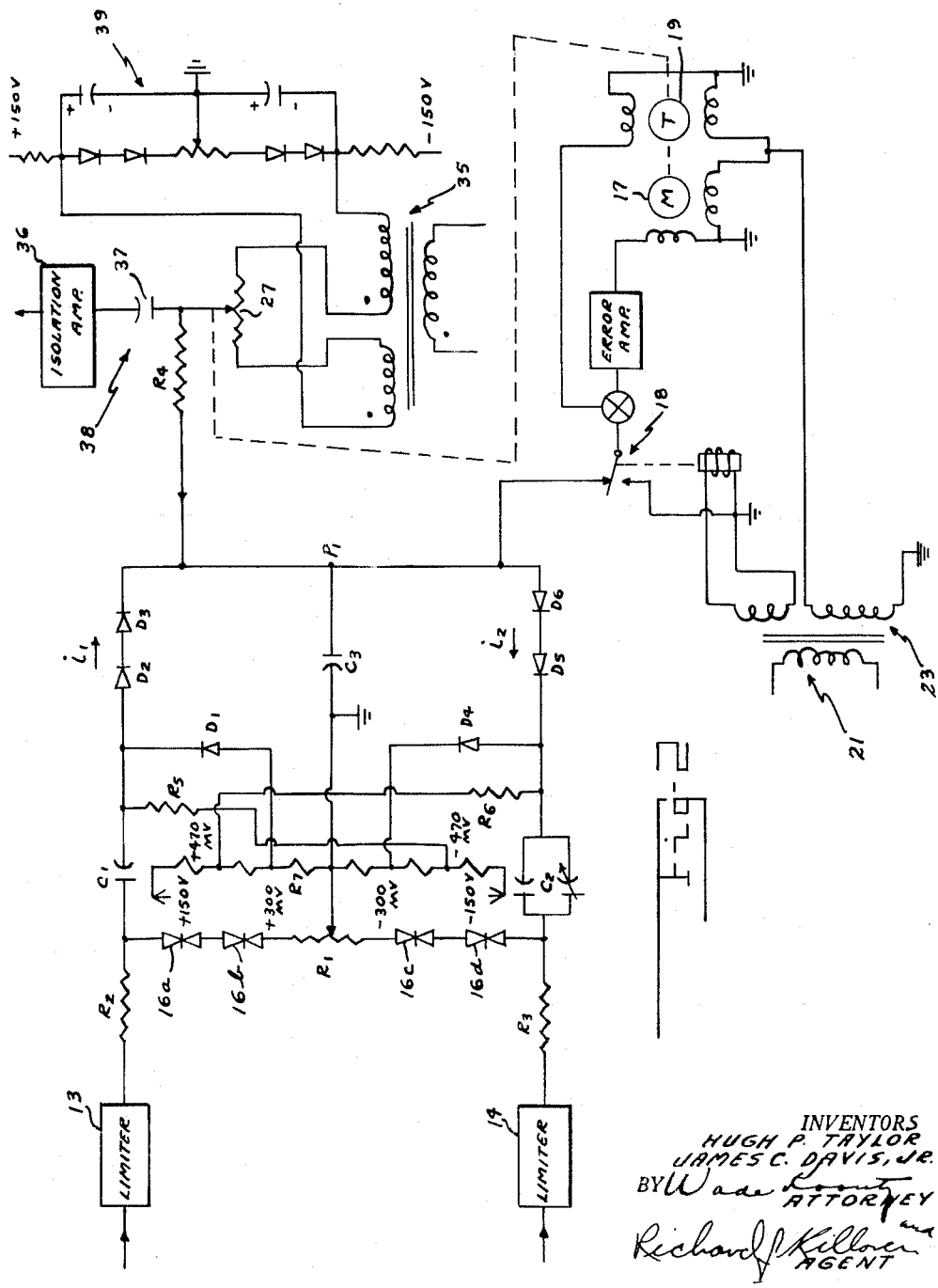
FIG. 2 is a circuit diagram of the device of FIG. 1 used for amplitude modulation of an A.C. carrier output voltage proportional to the difference of two frequencies.

If an amplitude modulated A.C. carrier output signal is desired, the circuit of FIG. 2 can be used. Circuit elements which are identical to those shown in FIG. 1 are given like reference characters. The circuit of FIG. 2 is identical to that of FIG. 1 except that an A.C. carrier from an A.C. supply 35 is applied across the terminals of the servocontrolled potentiometer 27 in addition to the D.C. reference voltage from source 39 and an isolation amplifier 36 and blocking condenser 37 are connected in the output circuit 38. This will then provide an A.C. output signal with its amplitude proportional to the difference of the input frequencies $f_1$ and $f_2$.

Figure 3:
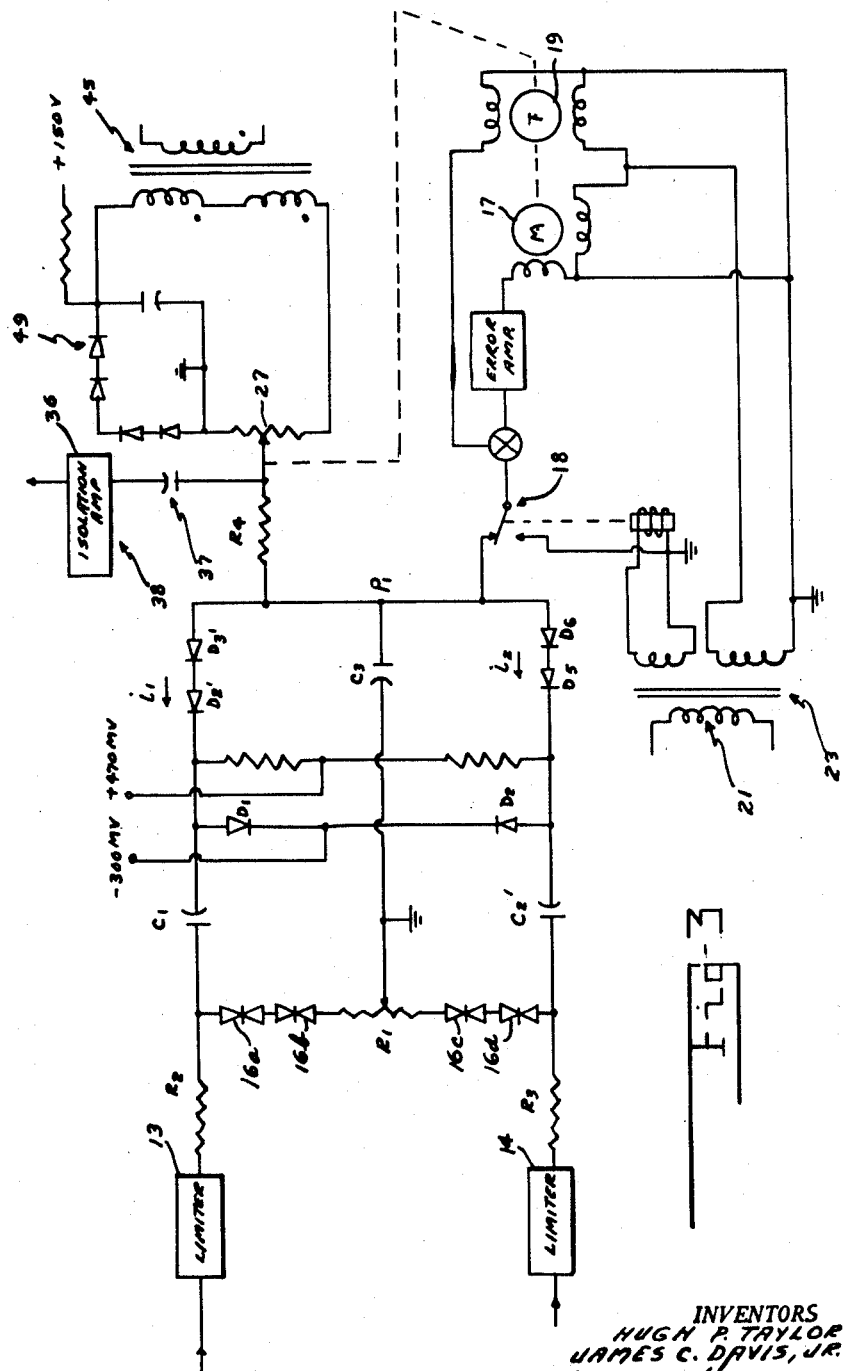
FIG. 3 is a circuit diagram of a modification of the device of FIG. 2 for providing an amplitude modulated A.C. carrier output voltage proportional to the sum of two frequencies.

FIG. 3 shows the circuit diagram of the basic sum computer. Elements in FIG. 3 which are identical to those in FIGS. 1 and 2 are given like reference characters. In this figure, the diodes $D_2'$ and $D_3'$ are connected in the same manner as diodes $D_5$ and $D_6$ so that the currents $i_1$ and $i_2$ are additive at the summing point $P_1$. The resulting output at 38 therefore has an A.C. signal with its amplitude proportional to the sum of the input frequencies $f_1$ and $f_2$.

There is thus provided a device for providing an output voltage which is proportional to a mathematical function of two frequencies.

While certain specific embodiments have been described in detail, it is obvious that numerous changes may be made without departing from the spirit and scope of the invention.

We claim:

1. A device for producing a control voltage proportional to a mathematical function of two frequencies comprising; a first capacitor, a charging circuit for said first capacitor including a silicon diode, a second capacitor, a charging circuit for said second capacitor including a second silicon diode, means for applying a square wave signal of a first frequency to the charging circuit for said first capacitor, means for applying a square wave of equal amplitude and a second frequency to the charging circuit for said second capacitor, a third capacitor, means including a first pair of diodes connected in series between said first capacitor and said third capacitor for transferring charge from said first capacitor to said third capacitor, means including a second pair of diodes connected in series between said second capacitor and said third capacitor for transferring charge from said second capacitor to said third capacitor, a source of reference potential, a servocontrolled potentiometer connected across said source of reference potential, a feedback resistor connected between the center arm of said servocontrolled potentiometer and the junction between said first and second pair of diodes and said third capacitor, means responsive to the voltage at the junction of said first and second pair of diodes and said third capacitor for adjusting the center arm of said serovcontrolled potentiometer to provide a nulling current to said junction and an output circuit connected to the junction of said feedback resistor and the center arm of said servocontrolled potentiometer.

2. A device for producing a control voltage proportional to the difference of two frequencies comprising; a first capacitor, a charging circuit for said first capacitor including a silicon diode, a second capacitor, a charging circuit for said second capacitor including a second silicon diode, means for applying a square wave signal of a first frequency to the charging circuit for said first capacitor, means for applying a square wave of equal amplitude and a second frequency to the charging circuit for said second capacitor, a third capacitor, means including a first pair of diodes connected in series between said first capacitor and said third capacitor for transferring charge of one polarity from said first capacitor to said third capacitor, means including a second pair of diodes connected in series between said second capacitor and said third capacitor for transferring charge of the opposite polarity from said second capacitor to said third capacitor, a source of reference potential, a servocontrolled potentiometer connected across said source of reference potential, a feedback resistor connected between the center arm of said servo-controlled potentiometer and the junction between said first and said second pair of diodes and said third capacitor, means responsive to the voltage at the junction of said first and second pair of diodes and said third capacitor for adjusting the center arm of said servocontrolled potentiometer to provide a nulling current to said junction and an output circuit connected to the junction of said feedback resistor and the center arm of said servocontrolled potentiometer.

3. A device for producing a control voltage proportional to the sum of two frequencies comprising; a first capacitor, a charging circuit for said first capacitor including a silicon diode, a second capacitor, a charging circuit for said second capacitor including a second silicon diode, means for applying a square wave signal of a first frequency to the charging circuit for said first capacitor, means for applying a square wave of equal amplitude and a second frequency to the charging circuit for said second capacitor, a third capacitor, means including a first pair of diodes connected in series between said first capacitor and said third capacitor for transferring charge of one polarity from said first capacitor to said third capacitor, means including a second pair of diodes connected in series between said second capacitor and said third capacitor for transferring charge of the same polarity from said second capacitor to said third capacitor, a source of reference potential, a servocontrolled potentiometer connected across said source of reference potential, a feedback reistor connected between the center arm of said servocontrolled potentiometer and the junction between said first and second pair of diodes and said third capacitor, means responsive to the voltage at the junction of said first and second pair of diodes and said third capacitor for adjusting the center arm of said servocontrolled potentiometer to provide a nulling current to said junction and an output circuit connected to the junction of said feedback resistor and the center arm of said servocontrolled potentiometer.

4. A device for producing a control voltage proportional to the difference of two frequencies comprising; a first capacitor, a charging circuit for said first capacitor including a silicon diode, a second capacitor, a charging circuit for said second capacitor including a second silicon diode, means for applying a square wave signal of a first frequency to the charging circuit for said first capacitor, means for applying a square wave of equal amplitude and a second frequency to the charging circuit for said second capacitor, a third capacitor, means including a first pair of diodes connected in series between said first capacitor and said third capacitor for transferring charge of one polarity from said first capacitor to said third capacitor, means including a second pair of diodes connected in series between said second capacitor and said third capacitor for transferring charge of opposite polarity from said second capacitor to said third capacitor, means for biasing said first and second silicon diode above the knee of their current-voltage characteristic with zero input signal and for biasing said first pair of diodes and said second pair of diodes below the knee of their current-voltage characteristic, a D.C. supply, a servocontrolled potentiometer connected across said D.C. supply, means for impressing an A.C. carrier voltage across said servocontrolled potentiometer, a feedback resistor connected between the said servocontrolled potentiometer and the junction between said first and second pair of diodes and said third capacitor, means responsive to the voltage at the junction of said first and second pair of diodes and said third capacitor for adjusting the center arm of said servocontrolled potentiometer to provide a nulling current to said junction, an output circuit connected to the junction of said feedback resistor and said servocontrolled potentiometer and an isolation amplifier connected in said output circuit.

5. A device for producing a control voltage proportional to the sum of two frequencies comprising; a first capacitor, a charging circuit for said first capacitor including a silicon diode, a second capacitor, a charging circuit for said second capacitor including a second silicon diode, means for applying a square wave signal of a first frequency to the charging circuit for said first capacitor, means for applying a square wave of equal amplitude and a second frequency to the charging circuit for said second capacitor, a third capacitor, means including a first pair of diodes connected in series between said first capacitor and said third capacitor for transferring charge of one polarity from said first capacitor to said third capacitor, means including a second pair of diodes connected in series between said second capacitor and said third capacitor for transferring charge of the same polarity from said second capacitor to said third capacitor, means for biasing said first and second silicon diode above the knee of their current-voltage characteristic with zero input signal and for biasing said first pair of diodes and said second pair of diodes below the knee of their current-voltage characteristic, a D.C. supply, a servocontrolled potentiometer connected across said D.C. supply, means for impressing an A.C. carrier voltage across said servocontrolled potentiometer, a feedback resistor connected between the said servocontrolled potentiometer and the junction between said first and second pair of diodes and said third capacitor, means responsive to the voltage at the junction of said first and second pair of diodes and said third capacitor for adjusting the center arm of said servo-controlled potentiometer to provide a nulling current to said junction, an output circuit connected to the junction of said feedback resistor and said servocontrolled potentiometer and an isolation amplifier connected in said output circuit.

References Cited by the Examiner

UNITED STATES PATENTS 2,176,742 10/39 Pierre _____ 328—133 X
2,890,392 6/59 Bruck et al. _____ 328—133 X JOHN W. HUCKERT, *Primary Examiner.*

ARTHUR GAUSS, *Examiner.*